Patented May 28, 1940

2,202,356

UNITED STATES PATENT OFFICE 2,202,356

MALTOSE FERMENTATION

Alfred S. Schultz and Lawrence Atkin, Bronx, N. Y., assignors to Standard Brands Incorporated, New York, N. Y., a corporation of Delaware No Drawing. Application June 9, 1938, Serial No. 212,700

13 Claims. (Cl. 195—37)

The invention relates to the fermentation of maltose, and to a medium in which it may be effected. More particularly, it is concerned with a process wherein fermentation of maltose is augmented by the inclusion of readily fermentable carbohydrate materials, and includes correlated improvements and discoveries whereby the fermentation of maltose is initially enhanced.

The rate of fermentation of maltose has been found to be initially markedly slower than that of dextrose, and whereas dextrose fermentation starts promptly and continues at a rapid rate, that of maltose starts very slowly. The maltose fermentation rate, however, will usually increase slowly until after a time it will approximate that of dextrose.

It has been shown previously that this initially slow fermentation rate of maltose may be obviated by inclusion in the fermentation medium of a maltase extract of dried yeast. When using maltose as the carbohydrate material to be fermented, it is desirable to have the fermentation rate reach its maximum as quickly as possible, and it is an object of this invention to provide a process whereby such result may be attained.

A further object of the invention is the provision of a process in which the fermentation of maltose may be facilitated by including a readily fermentable carbohydrate material, or a material from which a readily fermentable carbohydrate is formed in the fermentation medium.

Another object of the invention is the provision of a process for accelerating the initial fermentation of maltose in a manner that may be easily, effectively and economically practiced, both on a large and a small scale.

A still further object of the invention provides a process in which the fermentation medium or maltose contains a small amount of added dextrose.

A specific object of the invention is the provision of a maltose ferementation medium which additionally contains a readily fermentable carbohydrate material, more definitely an added quantity of dextrose.

Other objects of the invention will in part be obvious and will in part appear hereinafter.

The invention accordingly comprises the several steps and the relation of one or more of such steps with respect to each of the others, and the composition possessing the features, properties and the relation of constituents, which are exemplified in the following detailed disclosure, and the scope of the invention will be indicated in the claims.

In the practice of the invention a fermentation medium containing maltose in preponderant amount and yeast may be prepared by dissolving maltose in suitable amount in water, introducing yeast thereinto, suitably by means of a suspension thereof in water, and adding thereto or including additively therein a readily yeast-fermentable carbohydrate material. This carbohydrate material possesses the property of accelerating or augmenting the initial fermentation rate of the maltose, and may be dextrose, or a saccharine material, such as invert sugar. The fermentation medium may also contain yeast assimilable salts, particularly nitrogen compounds, and especially ammonium salts, for example, ammonium sulfate, an ammonium phosphate, and the like.

A satisfactory acceleration of maltose fermentation has been obtained with the inclusion in the fermentation medium of a relatively small amount of the readily yeast-fermentable carbohydrate material. The percentage may be from 0.33% to about 7.0% or, more especially, to about 1.66% based on the initial maltose content. This amount, however, may be somewhat larger or somewhat smaller without detrimental effect, but commercially a smaller amount is to be preferred, since an amount larger than that required to give the desired impetus to the fermentation rate merely adds to the cost. Furthermore, the increase in the initial fermentation rate of maltose through the introduction of a readily fermentable carbohydrate material, especially dextrose, is exhibited over a pH range of from 2.6 to 6.4. We have observed that there is an accelerated rate of fermentation through the inclusion of dextrose in a maltose wort under different established conditions, for example, at pH values of 2.6, 3.7, 4.55, 5.55 and 6.4. The influence has been found to be more pronounced at pH values of 2.6 and 6.4.

As an illustrative embodiment of a manner in which the invention may be practiced, the following examples are presented:

Example I

The rate of fermentation is determined by preparing a suitable solution, placing this in a bottle or flask and determining the rate and quantity of gas evolved. The gas evolved is collected at atmospheric pressure, and desirably by displacement of a 10% calcium chloride solution with the reaction mixture being shaken and maintained at a temperature of about 30° C. The fermentation medium or mixture is made up to have a total volume of about 100 cc. This medium may be prepared by dissolving about 3 grams of maltose in water, adding thereto about 3 grams of fresh compressed yeast which has previously been mixed with water to a volume of about 25 cc., and making up to a final volume of 100 cc. The medium preferably contains also a yeast assimilable nitrogen compound, as an ammonium salt, and hence the above fermentation mixture may include 0.9 gram ammonium dihydrogen phosphate and 0.36 gram diammonium hydrogen phosphate.

To the mixture prepared as above described there may now be added varying amounts of a readily yeast-fermentable carbohydrate material, as dextrose. Thus, in one of the flasks containing the above medium there may be 0.2 gram of dextrose in conjunction with 2.8 grams of maltose. The medium containing only maltose developed substantially no gas for a period of 105 minutes, and thereafter to a period of 135 minutes only 10 cc. of gas were evolved. The medium containing 2.8 grams of maltose and 0.2 gram of dextrose showed an immediate rapid evolution of gas, such that after 35 minutes 50 cc. had been evolved, 70 minutes 110 cc., and after 105 minutes 225 cc. The very marked effect of dextrose upon the fermentation rate of maltose is thus shown, since without dextrose there was substantially no gas evolution after 105 minutes, whereas with a small amount of dextrose the evolution for a like period was substantially advanced and totaled about 225 cc.

*Example II*

Media like unto those described in Example I, i. e., containing maltose, yeast and salts, were prepared and subjected to the fermentation test, with and without the addition of a small amount of dextrose. One medium contained only 3 grams of maltose in 100 cc., a second contained additionally 10 mg. of dextrose, and a third contained additionally 50 mg. of dextrose. The marked effect of the dextrose upon the maltose fermentation rate was again demonstrated inasmuch as after 165 minutes the medium containing only maltose had evolved only about 35 cc. of gas, whereas that containing 10 mg. of dextrose had evolved about 87 cc., and that containing 50 mg. of dextrose had evolved about 320 cc.

*Example III*

Media such as described in Example I were prepared and carried through a fermentation with and without the addition of a small amount of dextrose and at varying pH values. The media contained maltose, yeast and salts, and were separated into two series. There was also prepared a series of buffers having pH values of 2.6, 3.70, 4.55, 5.55 and 6.4, by taking 20 grams of ammonium dihydrogen phosphate, 40 grams of dipotassium hydrogen phosphate and 71 grams of citric acid and adding different amounts of sodium hydroxide to give the desired pH, with a dilution to one liter. 10 ml. of these buffer solutions were then added to 100 ml. of the maltose containing solution. To each portion of these solutions there was then added 50 mg. of dextrose and the fermentation rate noted. The following table presents the ml. of gas evolved at the various pH values in a medium containing only maltose, and in a medium containing dextrose in addition to the maltose. These values were determined after a time interval of 150 minutes.

|  | pH | | | | |
| --- | --- | --- | --- | --- | --- |
|  | 2.6 | 3.7 | 4.55 | 5.55 | 6.4 |
| Maltose | 18 | 83 | 105 | 55 | 5 |
| Maltose + dextrose | 63 | 212 | 255 | 185 | 75 |

It will be observed that a maximum value is reached at a pH of 4.55. Also, that the dextrose increases the fermentation rate or amount of gas evolved several fold, especially at a pH of 6.4 where the increase was fifteen fold.

The foregoing procedures provide a ready method for accelerating the initial fermentation rate of maltose, and this is readily and effectively accomplished by the addition to the fermentation medium of a readily yeast-fermentable carbohydrate material, specifically, dextrose in a relatively small amount but such as is capable of accelerating the initial maltose fermentation rate. It will be observed that the medium, more particularly, is an aqueous non-starchy solution, that is, a solution which is substantially devoid of starch and is contradistinctive to a dough which is a pasty mass containing much starch. Moreover, the acceleration is effective at different pH values with a substantially maximum fermentation within a given period of time being attained at a pH of 4.5, but that the greatest noted acceleration was at a pH of 6.4. The manner in which the presence of the added carbohydrate, as dextrose, brings about the distinctive increase in the maltose fermentation rate is rather difficult of explanation. It is our present thought that the effect is caused by the influence which the readily fermentable carbohydrate material, or perhaps its fermentation products, have upon the permeability of the wall of the yeast cells.

This application is a continuation-in-part of my copending application Serial No. 175,412, filed November 19, 1937.

Since certain changes in carrying out the above process, and certain modifications in the composition which embody the invention may be made without departing from its scope, it is intended that all matter contained in the above description shall be interpreted as illustrative and not in a limiting sense.

Having described our invention, what we claim as new and desire to secure by Letters Patent is:

1. A process for increasing the fermentation rate of maltose, which comprises effecting fermentation of maltose by yeast in an aqueous solution containing dextrose in an amount of from 0.33% to about 7% based on the quantity of maltose initially present.

2. A process for increasing the fermentation rate of maltose, which comprises effecting fermentation of maltose by yeast in an aqueous solution containing dextrose in an amount of from 0.33% to about 7% based on the quantity of maltose initially present, and a yeast-assimilable ammonium compound.

3. A process for increasing the fermentation rate of maltose, which comprises effecting fermentation of maltose by yeast in an aqueous solution having a pH value of 2.6 to 6.4, a preponderant amount of maltose and a small amount of dextrose which is capable of accelerating the initial fermentation rate of the maltose.

4. A process for increasing the fermentation rate of maltose, which comprises effecting fermentation of maltose by yeast in an aqueous nonstarchy solution having a pH value of 4.5 and containing maltose in preponderant amount and dextrose in a relatively small amount capable of accelerating the initial fermentation rate.

5. A process for increasing the fermentation rate of maltose, which comprises effecting fermentation of maltose by yeast in an aqueous nonstarchy solution having a pH value of about 6.4 and containing maltose in preponderant amount and dextrose in an amount of from 0.33% to about 7% based on the quantity of maltose initially present.

6. A maltose fermentation medium which contains in aqueous solution a preponderant amount of maltose and dextrose in an amount of about 0.33% to about 7% based on the quantity of maltose initially present, said medium having a pH value of about 4.5.

7. A maltose fermentation medium which contains in aqueous solution a preponderant amount of maltose and dextrose in an amount of about 0.33% to about 7% based on the quantity of maltose initially present, said medium having a pH value of about 6.4.

8. A process for increasing the fermentation rate of maltose, which comprises effecting fermentation of maltose by yeast in an aqueous solution containing a preponderant amount of maltose and a small amount of dextrose which is capable of accelerating the initial fermentation rate of the maltose.

9. A process for increasing the fermentation rate of maltose, which comprises effecting fermentation of maltose by yeast in an aqueous non-starchy solution containing a preponderant amount of maltose and a small amount of dextrose which is capable of accelerating the initial fermentation rate of maltose.

10. A process for increasing the fermentation rate of maltose, which comprises effecting fermentation of maltose by yeast in an aqueous non-starchy solution containing a preponderant amount of maltose, a small amount of dextrose which is capable of accelerating the initial fermentation rate of maltose, and a yeast assimilable ammonium compound.

11. A maltose fermentation medium, which comprises in aqueous solution a preponderant amount of maltose and an amount of dextrose which is from about 0.33% to about 7% based on the quantity of maltose initially present.

12. A maltose fermentation medium, which comprises in aqueous solution a preponderant amount of maltose, an amount of dextrose which is from about 0.33% to about 7% based on the quantity of maltose initially present, and a yeast assimilable ammonium compound.

13. A maltose fermentation medium which contains in an aqueous non-starchy solution maltose in preponderant amount and dextrose in an amount of from 0.33% to about 7% based on the quantity of maltose initially present, said medium having a pH value of 2.6 to 6.4.

ALFRED S. SCHULTZ.
LAWRENCE ATKIN.